March 28, 1944. W. F. SCHOLZE, JR 2,345,541
POLYMERIZATION OF SYNTHETIC RESIN IMPREGNATED FABRICS
Filed Aug. 22, 1941
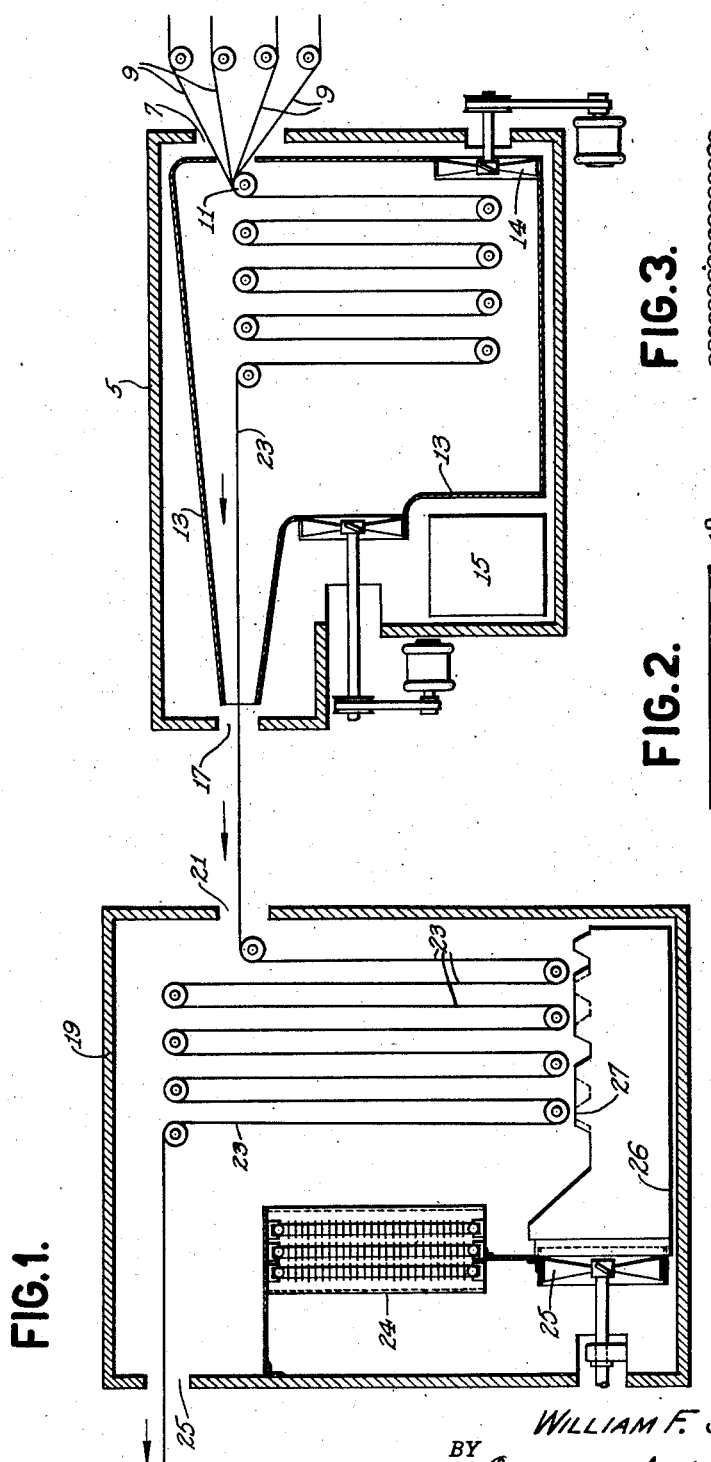
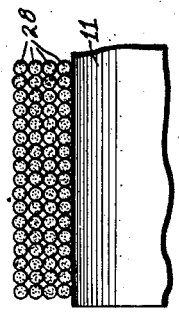
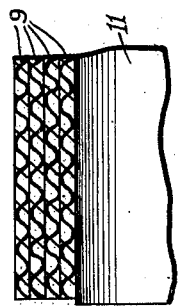
INVENTOR
WILLIAM F. SCHOLZE JR.
BY Alton and Griswold
ATTORNEYS Patented Mar. 28, 1944

2,345,541

UNITED STATES PATENT OFFICE 2,345,541

POLYMERIZATION OF SYNTHETIC RESIN IMPREGNATED FABRICS

William Frederick Scholze, Jr., New Milford, Conn., assignor to The Robertson Bleachery & Dye Works, Incorporated, New Milford, Conn., a corporation of Connecticut Application August 22, 1941, Serial No. 407,878

4 Claims. (Cl. 34—31)

This invention relates to the treatment of textile materials impregnated with synthetic resins and more particularly to processes effecting the final condensation or polymerization of synthetic resins impregnating textile materials of various kinds.

Heretofore it has been the practice to pass a single web or strand of textile material, previously impregnated with synthetic resin components and dried, through a curing oven, it being understood that the time necessary to effect polymerization of the resinous impregnating medium was inversely proportional to the temperature to which the material was subjected. In other words, in resinous bodies of appreciable mass the heat conductivity of the mass was a limiting factor. Thus the design of curing ovens and their operation was based upon the old established principle that any increase in the speed of effecting polymerization must be accompanied by an increase in the volume of hot air through which the textile materials passed on the theory that the drying of wet materials such as fabrics was due to exhaustion of the moisture content. Therefore, a higher moisture content of material occupying a given extent of curing chamber was believed to require either additional hot air, or an enlargement of the curing oven, or a slowing down of the rate of travel of the impregnated material through the oven, and thereby give a greater time for curing, to obtain a given result in the curing of textile materials containing resinous materials. The results of such proposals, however, were not commensurate with the increased expenditures necessary to attain them.

I have discovered that textile materials impregnated with synthetic resinous materials, or at least with synthetic resinous materials falling within a fairly large group, may be treated in a manner contrary to that heretofore believed necessary to effect polymerization or curing of the resinous components and that such curing may be effective with no regard to moisture exhaustion but solely by subjecting the impregnated textile material to that temperature at which the synthetic resin content of the fabric polymerizes or cures. In accordance with the principle I have discovered, a temperature sufficient to cure a given quantity of resinous material in a single strip or strand of textile fabric of a given weight will cure as many strips or strands of this given weight, each of which contains the given quantity of resinous material, as can be passed simultaneously through the oven. Thus, I am enabled to cure, simultaneously, a plurality of strips or strands of the impregnated textile material without raising the temperature of the oven over that required for a single strand or strip nor increasing the size of the curing oven. In so doing, the surfaces of the strips or strands are in contact with one another, either by superimposing a plurality of strips one upon another or a plurality of rows of strands, such as yarns, a yarn touching adjacent yarns both beside, above and below. When proposing to effect polymerization in this manner to those skilled in the art, I was advised against attempting it and was assured that such touching surfaces would block off or shield the inner strips or strands from the heat of the curing oven.

In carrying my improved process into effect, I first preheat the impregnated fabric and then subject the preheated fabric to a curing temperature.

The resins used may be any of the water soluble urea-formaldehyde condensates, such as those sometimes referred to as methylol ureas or dimethylol ureas, and may be condensed in the presence of water or water soluble alcohols such as ethyl alcohol or ethylene glycol. Of such resins, I prefer to use those with a low degree of polymerization which possess a higher water solubility. It is also possible to use the low condensation products of phenol formaldehyde although the water soluble phenol formaldehyde resins are, of course, limited in their application to those situations where the imparting of a dark color to the fabric is not objectionable. Resins of this general class are disclosed in United States Patent No. 1,734,516.

The textile material, strips or yarn, impregnated with the synthetic resin, may first be dried on an ordinary tentering frame at the usual temperatures at which wet goods are ordinarily dried. Drying temperatures of from 160° F. to 200° F. have been found suitable. A plurality of touching strips or yarns of textile material is then passed through a drying oven maintained at a temperature of approximately 330° F. This preliminary heating step is primarily for the purpose of heating the fabric so as to expedite the cure in the subsequent step and variations from this temperature of 330° F. are possible. This preheating step may also be termed a "soaking" step, as its function is to preheat the material to a temperature which is higher than the subsequent "curing" temperature, now to be described. The textile material, upon leaving the first drying chamber, passes at once into a second oven where a temperature preferably of 310° F. is maintained. The textile material is retained in this oven, preferably by passing it therethrough at a sufficiently slow rate of speed, until the resin has had sufficient time to polymerize. The rate of speed, of course, will depend upon the size of the curing oven, that is to say, upon the distance the textile material is enabled to travel through the oven.

In order that the invention may be clearly understood and readily carried into effect, reference will now be had to the accompanying drawing illustrating somewhat diagrammatically the process of this invention in which:

Figure 1 is a view, somewhat diagrammatic, illustrating suitable apparatus within which the preliminary heating and subsequent polymerization of the textile material impregnated with resinous materials may be carried out, parts being broken away in the interest of compactness of illustration;

Figure 2 is a view showing a plurality of strips of textile material superimposed in touching relation, in this instance four layers deep, as they pass through the respective chambers; and Figure 3 is a view similar to Figure 2 but showing touching rows of yarns of fabric material, in this instance also four rows deep.

While any suitable preliminary drying chamber is suitable for the purpose at hand and may be availed of, there is illustrated in Figure 1 a drying chamber 5 having an opening 7 through which may enter a plurality of individual strips or rows of yarn shown in this instance as four in number and each indicated by the reference character 9. These strips or rows of yarn converge at a roller 11 where they become superimposed in touching relation to the adjacent textile material as indicated in Figure 2 and pass in a circuitous path through the tunnel formed by the perforate walls 13 through which air heated by the heating unit 15 is sucked by the fan 14. The temperature of the air coming in contact with the textile material is maintained at a temperature of approximately 330°. The fabric is sufficiently heated for the purpose at hand when it reaches the exit opening 17 where it is transferred immediately to the curing oven 19 through an opening 21 and maintained still in the touching position indicated in Figure 2 throughout its travel through the curing oven 19. The laminations of textile material travel in a circuitous path through this oven as indicated at 23, and pass out of the oven through the exit 25. The temperature maintained in the oven is preferably in the neighborhood of 310°. An air heating unit to this end is indicated at 24 and heated gaseous medium, such as air, is blown therefrom by the fan 25 into a conduit 26 from which the gaseous medium is directed through outlets 27 to treated fabric in its travel. The path of travel through the oven is so devised that the textile material will pass therethrough at a sufficiently low rate of speed to permit the resin sufficient time to polymerize.

The same procedure may be adopted with respect to individual strands or yarns of material. Figure 3 shows four rows of yarns 28 superimposed one upon each other and each yarn touching its neighbor at all sides. The same procedure is followed in connection with individual yarns or strands as that described in respect of the textile material of the Figure 2 modification and the line 23 may represent the plurality of superimposed rows of strands 27 of the Figure 3 modification as well as the strips 9. Herein the term "strands" is used as generic of textile fabric in strip, i. e., cloth, or yarn form.

The four strips or rows of strands illustrated in the drawing are used by way of illustration and not in limitation, but it will be obvious that even with four strips 9 the production of cured strips of textile impregnated with resinous materials is increased three hundred percent and apparently the number of strands capable of being used is determined only by the available space within the respective chambers 5 and/or 19.

Various modifications will occur to those skilled in the art in the composition of the resinous material impregnating the textile material as well as in the type of and form taken by the textile material and in the character of the heating and curing chambers as well as the manner of conducting the material to be treated therethrough and no limitation is intended by the phraseology of the foregoing specification or illustrations in the accompanying drawing except as indicated in the appended claims.

What is claimed is:

1. The method of curing strands of textile material impregnated with resinous materials comprising subjecting a plurality of superimposed impregnated strands, forming multiple layers the respective surfaces of which are touching, to a preheating at a temperature of substantially 330° F., followed by a second heating at a lower temperature of substantially 310° F. required to cure a single one of the strands.

2. The method of curing strands of textile material impregnated with resinous materials comprising subjecting a plurality of superimposed and contacting impregnated strands to a preliminary heating step or soaking heat of 330° F. and then polymerizing the resinous impregnation by subjecting the superimposed and contacting strands to a temperature of substantially 310° F. and for that time required to cure the resinous impregnation of a single similar strand.

3. The method of curing strands of textile materials impregnated with resinous materials, comprising feeding continuous lengths of superimposed impregnated strands through drying chambers at slow speed, each of which strands is impregnated with an equal quantity of resinous materials, and subjecting them to a preliminary heating at a temperature of substantially 330° F., followed by heating to a lower curing temperature for one such strand.

4. The method of curing strands of textile material, each of which is of the same weight and impregnated with the same quantity of urea-formaldehyde products in solution, comprising subjecting a plurality of superimposed impregnated strands to a solvent removing step at temperatures of the order of 160° F. to 200° F., then juxtaposing the strands so that the respective surfaces are touching, thereafter preheating the strands at a temperature of the order of 330° F., and above the normal polymerizing temperature of the strands, and then heating to a lower temperature of substantially 310° F. and for the time period required to cure a single one of the strands.

WILLIAM FREDERICK SCHOLZE, Jr.